J. S. MARDON & L. D. FAY.
HINGE.
APPLICATION FILED SEPT. 8, 1915.
1,166,702.
Patented Jan. 4, 1916.
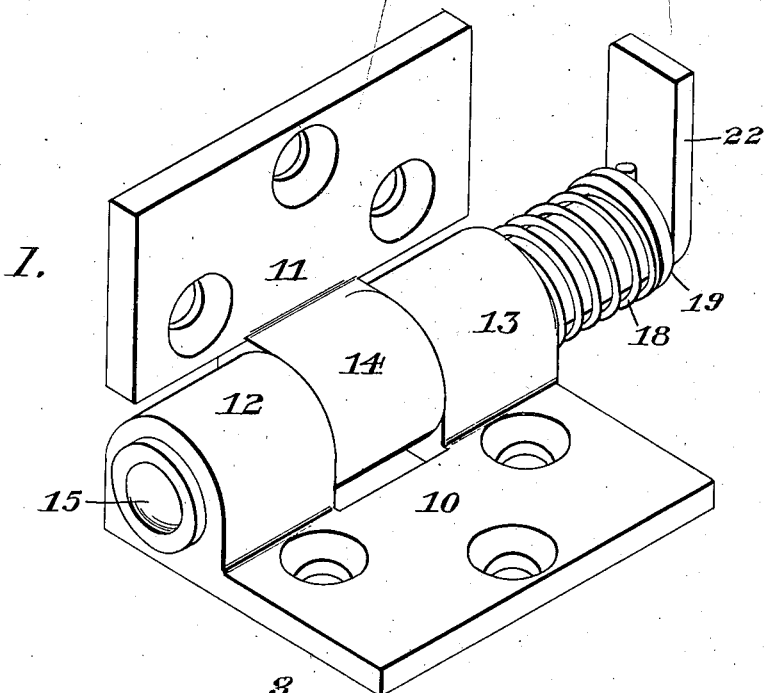
Fig. 1.
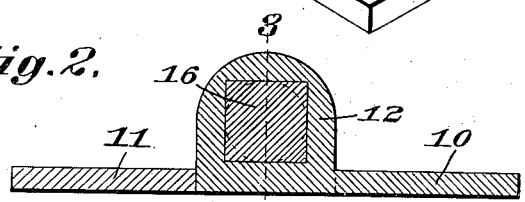
Fig. 2.
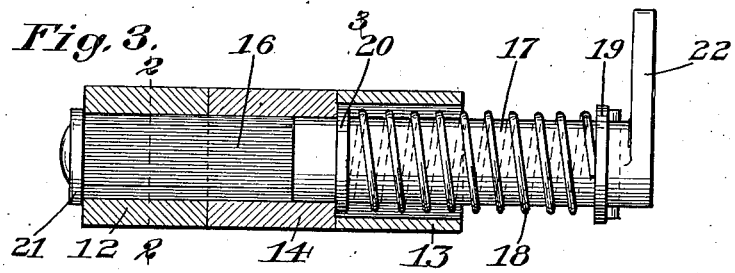
Fig. 3.
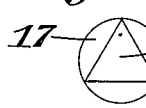 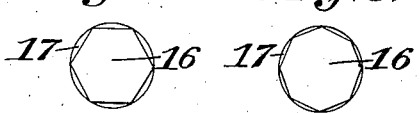 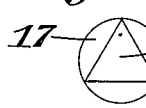
Fig. 4.  Fig. 5.  Fig. 6.
WITNESSES:
B. W. Doolin
L. J. Forde
INVENTORS
John S. Mardon
Louis D. Fay
BY Strong & Townsend
ATTORNEYS

UNITED STATES PATENT OFFICE.

JOHN S. MARDON AND LOUIS D. FAY, OF LOYALTON, CALIFORNIA.

HINGE.

1,166,702.  Specification of Letters Patent.  Patented Jan. 4, 1916.

Application filed September 8, 1915. Serial No. 49,434.

*To all whom it may concern:*

Be it known that we, JOHN S. MARDON and LOUIS D. FAY, citizens of the United States, residing at Loyalton, in the county of Sierra and State of California, have invented new and useful Improvements in Hinges, of which the following is a specification.

This invention relates to hinges, and has for its object to provide a self-locking hinge, easily controllable and of simple and inexpensive construction.

In carrying out this object we employ the usual hinge plates, carrying an elongated, endwise movable pintle normally held in position, by means of a spring, to interlock the plates, and adapted to release said plates when moved longitudinally against the spring.

One form which our invention may assume is exemplified in the following description and illustrated in the accompanying drawings, in which—

Figure 1 shows a perspective view of a hinge embodying our invention. Fig. 2 shows a transverse sectional view of the hinge taken on line 2—2 of Fig. 3. Fig. 3 shows a central, longitudinal, sectional view, taken on line 3—3 of Fig. 2. Figs. 4, 5 and 6 show end views of the pintle employed in our hinge, illustrating various modifications in the cross sectional shape thereof.

Referring in detail to the drawings, hinge plates 10 and 11 are shown; the plate 10 having formed thereon spaced bearing boxes 12 and 13, between which is a bearing box 14 of the plate 11, all of said bearings being alined to receive a pintle 15. The bearing boxes 12 and 14 are provided with angular bores, as shown in Figs. 2 and 3, and the portion 16 of the pintle normally residing therein is of a corresponding shape in cross section and thereby serves to interlock the plates 10 and 11 against pivotal movement. The other bearing box 13 may be provided with a circular bore, slightly enlarged, and the adjacent portion 17 of the pintle is circular in cross section and normally projects beyond the bearing 13.

A pressure coil spring 18 surrounds the circular or cylindrical portion of the pintle, lying partly within the bearing 13 and partly beyond the same, and is held in place at one end by a stationary washer 19 and at the other end by a slidable washer 20 abutting the adjacent end of the bearing box 14, serving thereby to maintain the angular portion of the pintle within the angular bores of the bearing boxes 12 and 14. A head 21, formed on the pintle on the end of the angular portion thereon, serves, by engagement with the bearing box 12, to limit the endwise movement of the pintle under the action of the spring.

Normally a small part of the cylindrical portion of the pintle lies within the angular bore of the bearing 14, and the parts are so proportioned that the entire angular portion of the pintle may be moved outside of the bearing boxes as the spring is depressed, thereby leaving only the cylindrical portion within and thereby permitting free pivotal action of the hinge plates. We provide an arm or other device 22, on the end of the cylindrical portion of the pintle, for convenience in moving the same endwise in its bearings.

In the operation of this hinge, it will be understood that the pintle is normally held in the position shown in Figs. 1 and 3 under the force of the pressure spring 18, by reason of which the hinge plates are locked against pivotal movement. When it is desired to unlock the hinge, the operator presses against the arm 22, depressing the spring and thrusting the pintle endwise until the angular portion thereon has been moved outside of the bearings, whereupon the device will operate as an ordinary hinge. Upon releasing the pressure from the arm 22, the spring will instantly return the pintle to position for interlocking the plates.

A hinge of this character, obviously, has a variety of uses and, in practice, may have its projecting end or arm 22 coöperating with a trip device to automatically unlock the hinge, and we have shown such an application of the same in a co-pending case entitled "Wood working machine" filed of even date herewith.

Figs 4, 5 and 6 show modified forms of the pintle and illustrate a variety of angular shapes for the interlocking portion thereof. The octagonal form, shown in Fig. 6, it will be seen, offers a maximum variety of locking positions for the hinge. Numerous changes in the construction and arrangement of the several parts of this hinge may be resorted to without departing from the spirit of our invention as disclosed in the appended claim.

Having thus described our invention, what we claim and desire to secure by Letters Patent is—

In a hinge, a hinge plate having a bearing box provided with a perforation of angular section, a second hinge plate having spaced bearing boxes between which the first bearing box is received, one box of the second hinge plate being provided with a perforation of similar section as that of the first bearing box, and the other box of the second plate being provided with a perforation of larger diameter extending through the ends of said other box, a pintle having a portion of angular section slidably engaged in the box perforations of angular section and a cylindrical portion adapted for sliding movement in the first bearing box and being normally disposed in and extending beyond the aforesaid other box of the second hinge plate, a coiled spring surrounding the cylindrical portion of the pintle and extending with the other box of the second plate, a stationary abutment on the outer end of the pintle on which the adjacent end of the spring seats, and a washer slidably mounted on the cylindrical portion of the pintle and seating against the first bearing box, the inner end of the spring bearing on the slidable washer and holding it seated.

In testimony whereof we have hereunto set our hands in the presence of subscribing witnesses.

JOHN S. MARDON.
LOUIS D. FAY.

Witnesses:
HENRY B. NEVILLE,
CHAS. SCHLEEF,
A. G. MEDEARIS.